May 19, 1925.
M. C. WHITE
TEMPERATURE INDICATOR
Filed Oct. 13, 1923
1,538,418
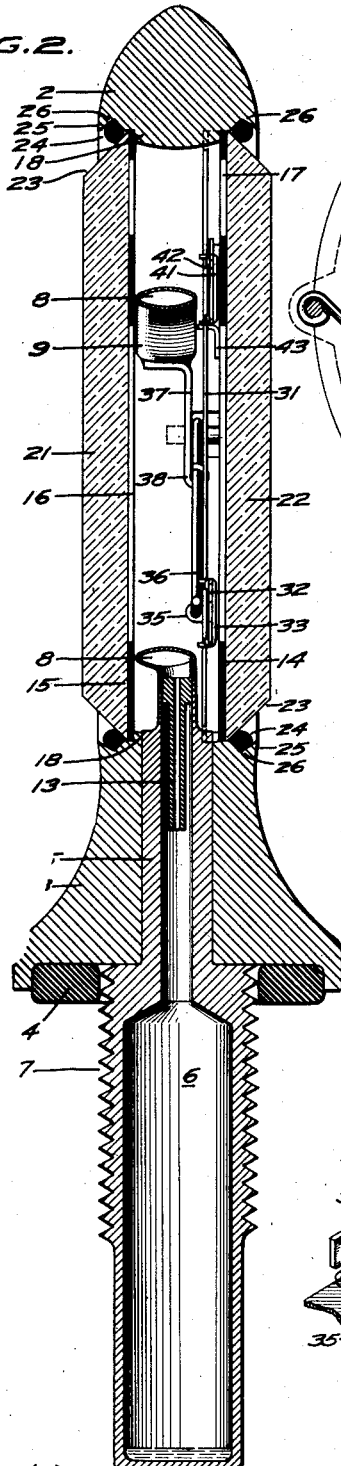
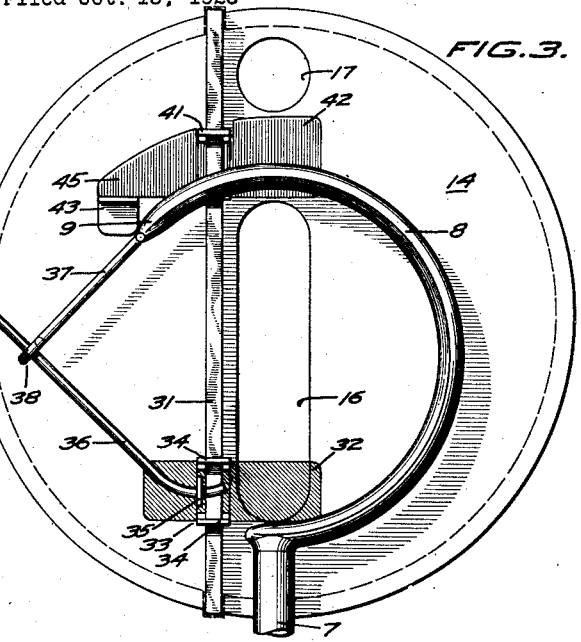
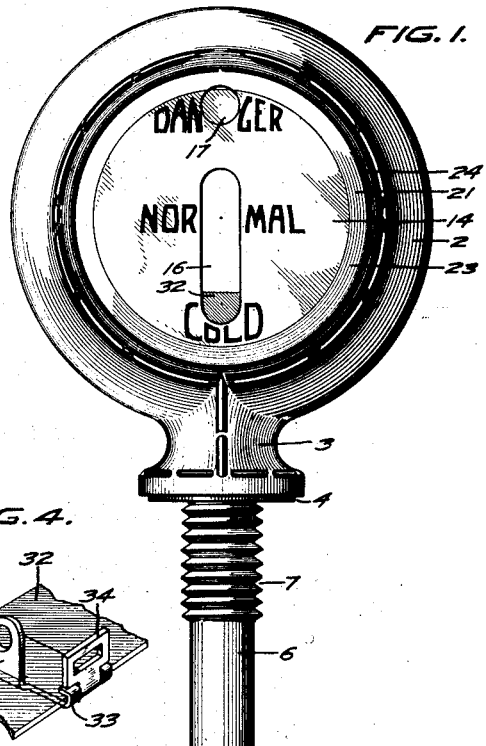
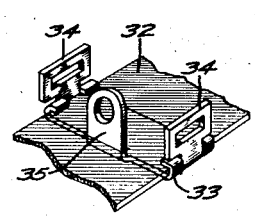
INVENTOR
MORRIS C. WHITE
HIS ATTORNEYS Patented May 19, 1925.

1,538,418

UNITED STATES PATENT OFFICE.

MORRIS C. WHITE, OF SAN FRANCISCO, CALIFORNIA, ASSIGNOR OF ONE-FOURTH TO ARTHUR C. THORPE, OF OAKLAND, CALIFORNIA.

TEMPERATURE INDICATOR.

Application filed October 13, 1923. Serial No. 668,295.

*To all whom it may concern:*

Be it known that I, MORRIS C. WHITE, a citizen of the United States, and a resident of the city and county of San Francisco, State of California, have invented a certain new and useful Temperature Indicator, of which the following is a specification.

The invention relates to a temperature indicator adapted to be associated with the water cooling system of an internal combustion engine on an automobile, for the purpose of indicating safe and dangerous temperatures of the engine.

An object of the invention is to provide a temperature indicating instrument which is sensitive to temperature changes and rugged in construction.

Another object of the invention is to provide a temperature indicator which operates to display one signal during the existence of safe temperatures and to display another signal during the existence of dangerous temperature.

Another object of the invention is to provide a temperature indicating instrument which is not deleteriously effected by the inversion of the instrument.

Another object of the invention is to provide improved means for securing the glass disc to the frame.

The invention possesses other advantageous features, some of which, with the foregoing, will be set forth at length in the following description, where I shall outline in full, that form of my invention which I have selected for illustration in the drawings accompanying and forming part of the present specification. In said drawings I have shown one form of temperature indicator embodying my invention, but it is to be understood that I do not limit myself to such form, since the invention, as set forth in the claims, may be embodied in a plurality of forms.

Referring to said drawings:—

Figure 1 is a front elevation of a temperature indicating instrument embodying my invention.

Figure 2 is a vertical cross section, on an enlarged scale, of the instrument of my invention.

Figure 3 is an elevation on an enlarged scale of the operative element of the indicator of my invention.

Figure 4 is a perspective view of the sliding flag for indicating safe variations in temperature.

The instrument of my invention is particularly adapted to be used for indicating the temperature of the water in the cooling system of an automobile engine. Indicators for this purpose are usually mounted on the radiator cap, with a temperature sensitive portion of the instrument extending through the cap into thermal contact with the water in the radiator.

The device of my invention comprises a frame 2, preferably circular in form provided on its lower end with a base 3 having a seat therein for the washer 4 which bears against the top of the radiator cap. The frame and base are preferably made of cast metal and embedded in the cast metal is the neck 5 of the chamber 6 which extends downward below the base. The chamber is provided at the upper portion of its outer face with a screw thread 7 for receiving a nut for clamping the instrument to the radiator cap. The walls forming the lower portion of the chamber are thin so that heat is rapidly conducted therethrough and the chamber contains a small charge of a volatile liquid, such as ether, so that the pressure within the chamber varies with the temperature of the chamber. The neck 5 of the chamber extends upward into the opening in the frame 2 and welded or soldered to the upper end of the neck is a pressure responsive device, preferably a Bourdon tube 8. Variations in temperature of the water in the radiator produce variations in pressure in the Bourdon tube 8 causing movement of the movable end 9 of the tube. This movement corresponds to changes in temperature. It often happens in the use of the instrument, that the instrument is inverted, for instance when the radiator cap is removed and this inversion of the instrument would cause the volatile liquid to flow from the chamber 6 into the tube 8, wherein it might be trapped, so that future readings of the instrument would be in error. To prevent this condition I provide means for preventing the small amount of volatile liquid in the chamber 6 from entering the tube 8 when the instrument is inverted. Disposed in the neck 5 is a nipple 13 which forms a liquid tight joint with the neck. The nipple has a short body in contact with the neck and extends downward into the neck, forming with the wall thereof, an annular chamber in which the liquid collects when the instrument is inverted. This causes the liquid to be retained in the chamber and prevents it from entering the tube. The nipple is provided with a small passageway therethrough to permit vapors to pass between the tube and the chamber, so that the pressure within the tube and chamber is always equal.

The opening in the frame is closed on opposite sides of the center thereof by dials 14 and 15 having apertures therein corresponding in position so that light may pass through the instrument. Each dial is provided with a vertically disposed elongated sight opening 16 arranged adjacent the lower portion of the dial and with a second sight opening 17, preferably circular in shape and disposed above and spaced from the sight opening 16. These dials seat against shoulders 18 of the frame and may be separately held in place or may be held in place by the glass disc or crystals 21 and 22 which form the opposite faces of the instrument. The glass discs are provided with outwardly inclined bevelled edges 23 and means are provided for holding these discs in fixed position. Each disc is centered by engagement with the internal periphery of the frame and is held in place by a metallic snap ring 24 which is interposed between the bevelled face of the disc and an overhanging shoulder 25 on the frame. This shoulder 25 comprises one of the walls of a V-shaped groove 26 formed in the inner periphery of the frame, the diameter of the inner edge of the shoulder 25 being substantially equal to the diameter of the disc, so that the disc may be readily inserted. The inclination of the wall 25 is slightly different than the inclination of the bevelled edges 23, the two surfaces approaching each other inward. The snap ring is interposed between the bevelled edge 23 and the inclined shoulder 25 and securely locks the disc in position. When it is desired to remove the disc, the snap ring is removed by any suitable sharp pointed tool and the disc is then free to be extracted. This construction eliminates the use of clamping rings for the disc, with the necessary screws for holding the clamping rings in place and greatly improve the appearance of the instrument and at the same time reduces the cost of manufacture.

Arranged within the frame and disposed vertically therein is a guide member 31 preferably in the form of a thin flat strip which is seated at its end in sockets formed in the internal peripheral face of the frame. This guide 31 is preferably arranged to one side of the sight openings 16 and 17. Slidably mounted on the slide 31 is a vertically movable flag 32 preferably formed of green translucent material such as celluloid. This flag 32 is mounted in a clip 33 which is freely slidable vertically on the guide and as the temperature conditions within the chamber 6 vary, this slide is moved upward and downward occupying varying positions behind the sight opening 16. This flag indicates safe working temperatures of the motor and is readily visible by the driver of the automobile. The clip 33 is provided with ears 34 through which the guides extend and is provided with an ear 35 through which an actuating lever 36 extends. The actuating lever 36 is pivoted to the frame 2, preferably on the horizontal center line of the frame and is provided on its movable end with a curved portion extending through the ear 35 so that the ear will not bind on the lever. Soldered or otherwise suitably secured to the free end 9 of the Bourbon tube is a link 37 which is provided at its other end with an eye 38 surrounding the lever 36. As the free end of the tube moves the lever 36 is moved about its pivot causing vertical movement of the flag 32. An increase in temperature within the chamber 6 causes the flag 32 to move upward along the side opening 16 and as long as this flag remains in this opening safe temperature conditions exist in the engine.

Mounted on the guide 31 above the sight opening 16 is a clip 41 carrying a red flag 42 made of suitable translucent material. This flag is normally supported behind the bridge between the sight opening 16 and 17 so that it is not visible. The flag is supported in this position by a bracket 43 formed on the rear of the dial 14 and being engaged by the projecting ear 45 of the flag 42. As the temperature within the chamber 6 increases beyond safe working limits, the clip 33 moves upward and contacts with the clip 41 and moves this clip upward to bring the flag 42 into vision in the aperture 17 thus indicating the presence of a dangerous temperature in the engine. The flag 32 moves up beyond the limit of the sight opening 16 so that when the flag 42 is visible the flag 32 is concealed. The instrument is very sensitive and quickly responsive so that upon the existence of a dangerous temperature, the flag 42 is very quickly displayed in the opening 17, causing a red signal to be displayed which impels the attention of the driver and notifies him of the dangerous temperature existing. The instrument thus not only serves as an indication of the temperature, but by displaying a red signal draws the attention of the driver to the existing dangerous conditions.

I claim:

1. A temperature indicating instrument comprising a disc having a vertically disposed elongated slot therein, a flag movable along said slot and being visible therethrough and temperature responsive means for imparting vertical movement to the flag, the vertical position of the flag being a function of the temperature.

2. A temperature indicating instrument comprising a disc having a vertically disposed elongated slot therein, a flag movable vertically along said slot and being visible therethrough, a guide on which said flag is slidably mounted and temperature responsive means for imparting vertical movement to said flag.

3. A temperature indicating instrument comprising a disc provided with two vertically alined spaced sight openings, a flag associated with each opening and temperature responsive means for first moving one flag for the height of the lower opening and then moving the second flag into position behind the upper opening.

4. A temperature indicating instrument comprising a disc provided with upper and lower sight openings, a flag associated with the lower opening, a normally concealed flag of different color associated with the upper opening and temperature responsive means for moving said flags with respect to said openings said lower flag being movable independently of the upper flag.

5. A temperature indicating instrument comprising a disc provided with upper and lower sight openings, a flag associated with the lower opening and movable along said opening to indicate temperature, a flag associated with the upper opening and movable to be visible through said opening to indicate a dangerous temperature and temperature responsive means operative to produce movement of the lower flag independently of the upper flag during normal temperature variations and to cause movement of the upper flag during abnormal temperature conditions.

6. A temperature indicating instrument comprising a disc provided with a vertically disposed elongated sight opening and a second opening above said first opening, a guide arranged adjacent said openings, a flag on said guide movable along said elongated opening, a flag on said guide movable into position behind said second opening and temperature responsive means actuated by an increase in temperature to first move the first flag along said elongated opening and then move the second flag into view behind said second opening.

7. A temperature indicating instrument comprising a disc provided with a vertically disposed elongated sight opening and a second opening above and spaced from the first opening, a guide arranged adjacent said openings, a flag visible through said elongated opening slidable on the lower part of said guide, a second flag slidable on the upper part of said guide and adapted to be moved into position behind said second opening, means for holding said second flag adjacent said second opening and temperature responsive means for moving said flags with respect to said openings.

8. A temperature indicating instrument comprising a disc provided with a vertically disposed elongated sight opening and a second opening above and spaced from the first opening, a guide arranged adjacent said openings, a flag slidably mounted on said guide and visible through the lower opening, a flag slidably mounted on said guide and normally concealed behind said disc below the second opening, means for supporting said second flag in position below said second opening and temperature responsive means connected to said first flag, an increasing temperature serving to cause upward movement of the first flag along said first opening into engagement with the second flag and movement of the second flag into position behind said second opening.

9. A temperature indicating instrument comprising a disc having two sight openings therein, a flag movable along one of said openings to indicate safe temperature conditions, a second flag normally disconnected from the first flag and movable into view behind the other opening to indicate dangerous temperature conditions, and temperature responsive means operating during normal temperature conditions for moving the first flag independently of the second flag.

10. A temperature indicating instrument comprising a disc having two vertically disposed spaced apertures therein, a flag movable along the lower opening to indicate safe temperature conditions, a flag of different color normally concealed behind said disc and adapted to be moved into view behind the upper opening to indicate dangerous temperature conditions, and temperature responsive means connected to said first flag, an increasing temperature serving to move said first flag vertically into engagement with said second flag and to move said second flag into view behind said second opening.

11. A temperature indicating instrument comprising a temperature responsive device having an end movable due to temperature variations, a temperature indicating slide, a lever engaging said slide and a link connecting said lever with the movable end of said device.

12. A temperature indicating instrument comprising a frame having an opening therein, a disc arranged in said opening, said disc being provided with a vertically disposed sight opening and a second sight opening disposed above said first opening and spaced therefrom, a guide in said frame, a red flag mounted on said guide and normally concealed behind said disc adjacent said second opening, a second flag slidably mounted on said guide and movable longitudinally thereof, a chamber adapted to contain a volatile liquid extending below said frame, a flexible metallic tube in said frame connected to said chamber and adapted to be flexed by varying pressures therein and means connecting the flexible end of said tube to said second flag whereby an increase in pressure in said tube causes said flag to move vertically along said first opening, the final upward movement of said first flag causing the second flag to be moved into view behind said second opening.

In testimony whereof, I have hereunto set my hand.

MORRIS C. WHITE.